United States Patent
Ciotola

(10) Patent No.: US 8,021,233 B2
(45) Date of Patent: Sep. 20, 2011

(54) WRAP AROUND COUPLING

(76) Inventor: Alfredo A. Ciotola, Warren, NJ (US)

( * ) Notice: Subject to any disclaimer, the term of this patent is extended or adjusted under 35 U.S.C. 154(b) by 379 days.

(21) Appl. No.: 12/210,271

(22) Filed: Sep. 15, 2008

(65) Prior Publication Data

US 2010/0069161 A1   Mar. 18, 2010

(51) Int. Cl.
  *F16D 3/54* (2006.01)
(52) U.S. Cl. .................. 464/49; 29/525.08; 464/93
(58) Field of Classification Search .......... 464/49, 464/55, 56, 88, 92–96; 29/525.08; 474/204, 474/205; 417/321, 362
See application file for complete search history.

(56) References Cited

U.S. PATENT DOCUMENTS

| | | | |
|---|---|---|---|
| 268,807 A | 12/1882 | Landis | |
| 1,188,113 A | 6/1916 | Thomas | |
| 1,343,413 A | 6/1920 | Smith et al. | |
| 1,365,957 A | 1/1921 | Smith | |
| 1,402,688 A | 1/1922 | Travis | |
| 1,482,097 A | 1/1924 | Smith | |
| 1,814,836 A | 7/1931 | Lederman | |
| 1,862,355 A | 6/1932 | Anderson | |
| 2,181,888 A | 12/1939 | Gustin | |
| 2,453,012 A | 11/1948 | Hickman | |
| 2,924,082 A * | 2/1960 | Reich | 464/92 X |
| 2,930,211 A | 3/1960 | Guy | |
| 3,304,743 A | 2/1967 | Paulsen | |
| 3,362,191 A * | 1/1968 | Louette | 464/49 |
| 3,422,637 A | 1/1969 | Kelley | |
| 3,698,209 A * | 10/1972 | Moro | 464/56 X |
| 3,724,239 A | 4/1973 | Calistrat | |
| 4,591,350 A | 5/1986 | Obermeier | |
| 5,676,613 A | 10/1997 | Valcourt et al. | |
| 6,159,102 A * | 12/2000 | Hennessey et al. | 464/88 |
| 6,325,722 B1 | 12/2001 | Ciotola | 464/85 |
| 6,342,011 B1 * | 1/2002 | Pokrandt et al. | 464/88 X |

FOREIGN PATENT DOCUMENTS

DK          89078   *   8/1960

* cited by examiner

*Primary Examiner* — Gregory Binda
(74) *Attorney, Agent, or Firm* — Roberts & Roberts, LLP

(57) ABSTRACT

A coupling for joining rotatable shafts including a pair of mating hubs having projecting pins, which hubs are held together via a free-floating wrap around restraint. The coupling has first and second circular hubs, wherein each circular hub has and a tool for fixing a shaft within each bore. Several coupling pins extend outwardly from each hub such that the coupling pins of the hubs are facing and longitudinally aligned with each other to define mating pairs of coupling pins. The coupling has a flexible annular restraint having split ends and semi-cylindrical concavities through the restraint. The restraint is wrapped around the mating pairs of coupling pins such that the split ends align and one mating pair of coupling pins are positioned within each of the semi-cylindrical concavities. A cincture is then fastened around the outer surface of the restraint.

20 Claims, 3 Drawing Sheets

WRAP AROUND COUPLING

BACKGROUND OF THE INVENTION

1. Field of the Invention

The present invention relates to shaft couplings. More particularly, the invention relates to a coupling for joining rotatable shafts including a pair of mating hubs having projecting pins, which hubs are held together via a free-floating wrap around restraint.

2. Description of the Prior Art

Rotatable shafts are typically used in conjunction with motor powered mechanical devices such as pumps and the like. These devices cooperate with a motor via a rotatable shaft which, when rotated along a fixed axis, rotate other machine parts. Because these shafts can only reach limited lengths, they are often connected to one another to form a longer, continuous rotatable shaft. Attempts have been made in the art to connect such rotating shafts and optionally compensate for misalignment, however rotational vibrations in such shafts and associated couplings eventually result in an angular distortion and misalignment between the shafts. Shaft axes inevitably exert a lateral force which causes bearings to wear out and leads to improper shaft rotation.

Various attempts have been made to compensate for misalignment between rotatable shafts. U.S. Pat. No. 268,807 discloses a coupling for shafts which includes a pair of end units with openings for the shafts and which are held onto the shafts via set screws. The end units have links that connect to a central unit via spherical ends on the links and transmits motion thereby. The pins may be spherical but they do not directly connect the end units with the central disk, rather, they are connected via intermediate linkages. U.S. Pat. No. 4,591,350 discloses a compensator coupling which includes an intermediate sleeve with resilient bushings for engaging shaft ends. A shaft presses against a spherical ring, and compression springs are required. U.S. Pat. No. 1,862,355 discloses a flexible coupling which includes a bar that carries spherical engagement pins. A bar is bent at right angles to form ends which carry spherical arrangement pins. U.S. Pat. No. 1,188,113 shows a three disk arrangement where the disks are attached by bolts surrounded by springs. U.S. Pat. No. 2,181,888 shows a three disk arrangement where the disks are indirectly connected via links. U.S. Pat. No. 1,482,097 shows a flexible coupling whose end members are linked by a support disk via straight pins. U.S. Pat. No. 3,304,743 shows a coupling having hubs which are connected via an intermediate plate. Ball connectors are intended to pivot and slide in the bore, and a shaft is required. U.S. Pat. No. 1,365,957 shows a spring coupling. U.S. Pat. No. 1,814,836 shows a shaft coupling with tapered coupling pins. Each of the foregoing designs are ineffective for tolerating shaft misalignment.

U.S. Pat. No. 6,325,722, which is incorporated herein by reference, shows a coupling for attaching a pair of longitudinally aligned, rotatable shafts which has a pair of circular hubs having a bore through a central axis and a shaft fixed within each bore. Several circular apertures are spaced around and through each hub and a hollow bushing is positioned in each circular aperture. A circular power ring is positioned between the hubs, the ring has several rounded coupling pins extending outwardly from its front and rear surfaces. The hub pins are mounted within a corresponding one of the hollow bushings through the power rings. The present invention has a different design wherein an annular restraint is positioned between the hubs and is wrapped around the coupling pins of each hub and holds the coupling pins which are within semi-cylindrical concavities of the restraint. The restraint has split ends which align. The restraint is then bound by a cincture such as a wrap around cincture which encircles the restraint. The restraint is free floating around the coupling pins which are positioned within the semi-cylindrical concavities and allows for pin misalignment without exerting a lateral force which causes bearings to wear out leading to improper shaft rotation. The restraint is easily and quickly removable and/or replaced without having to disturb the pins, the hub, the shafts or connecting equipment. Other types of wrap around couplings are known, however, these do not accommodate cylindrical or rounded coupling pins, nor do they compensate for misalignment. It would be desirable to provide a free-floating coupling device for joining rotatable shafts which tolerates axial movement and travels with any pin misalignment. The coupling device of the present invention solves this problem. Such a coupling allows for flexibility at the joining point while tolerating misalignment in the rotatable shafts. This allows the quick renewability of wedded parts.

SUMMARY OF THE INVENTION

The invention provides a coupling for attaching a pair of longitudinally aligned, rotatable shafts comprising:

a) a first circular hub and a second circular hub, each circular hub having a front surface; each circular hub having a bore through a central axis thereof and a tool for fixing a shaft within each bore; a plurality of coupling pins extending outwardly from the front surface of each circular hub; each of the coupling pins of the first circular hub being in close juxtaposition with, facing, and longitudinally aligned with a corresponding coupling pin of the second circular hub to define a plurality of mating pairs of coupling pins;

b) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; the restraint being positioned between the front surface of the first circular hub and the front surface of the second circular hub such that the restraint is wrapped around the mating pairs of coupling pins such that the split ends align and one mating pair of coupling pins is positioned within each of the semi-cylindrical concavities; and c) a cincture fastened around the outer surface of the restraint.

The invention also provides a process for attaching a pair of longitudinally aligned, rotatable shafts comprising:

i) providing a coupling comprising:

a) a first circular hub and a second circular hub, each circular hub having a front surface; each circular hub having a bore through a central axis thereof and a tool for fixing a shaft within each bore; a plurality of coupling pins extending outwardly from the front surface of each circular hub; each of the coupling pins of the first circular hub being positionable in close juxtaposition with, facing, and longitudinally aligned with a corresponding coupling pin of the second circular hub to define a plurality of mating pairs of coupling pins;

b) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; the restraint being positionable between the front surface of the first circular hub and the front surface of the second circular hub such that the restraint is wrappable around the mating pairs of coupling pins such that the split ends align and one mating pair of coupling pins is positionable within each of the semi-cylindrical concavities; and c) a cincture for fastening around the outer surface of the restraint;

ii) attaching a shaft to each circular hub through its bore;

iii) positioning the a first circular hub and the second circular hub in proximity to each other such that each of the coupling pins of the first circular hub are positioned in close juxtaposition with, facing, and longitudinally aligned with a corresponding coupling pin of the second circular hub to define a plurality of mating pairs of coupling pins;

iv) wrapping the restraint between the front surface of the first circular hub and the front surface of the second circular hub such that the split ends align and one mating pair of coupling pins is positioned within each of the semi-cylindrical concavities; and v) fastening a cincture around the outer surface of the restraint.

The invention further provides a retainer for a shaft coupling comprising:

a) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; and b) a cincture for fastening around the outer surface of the restraint.

DETAILED DESCRIPTION OF THE PREFERRED EMBODIMENT

Figure 1:
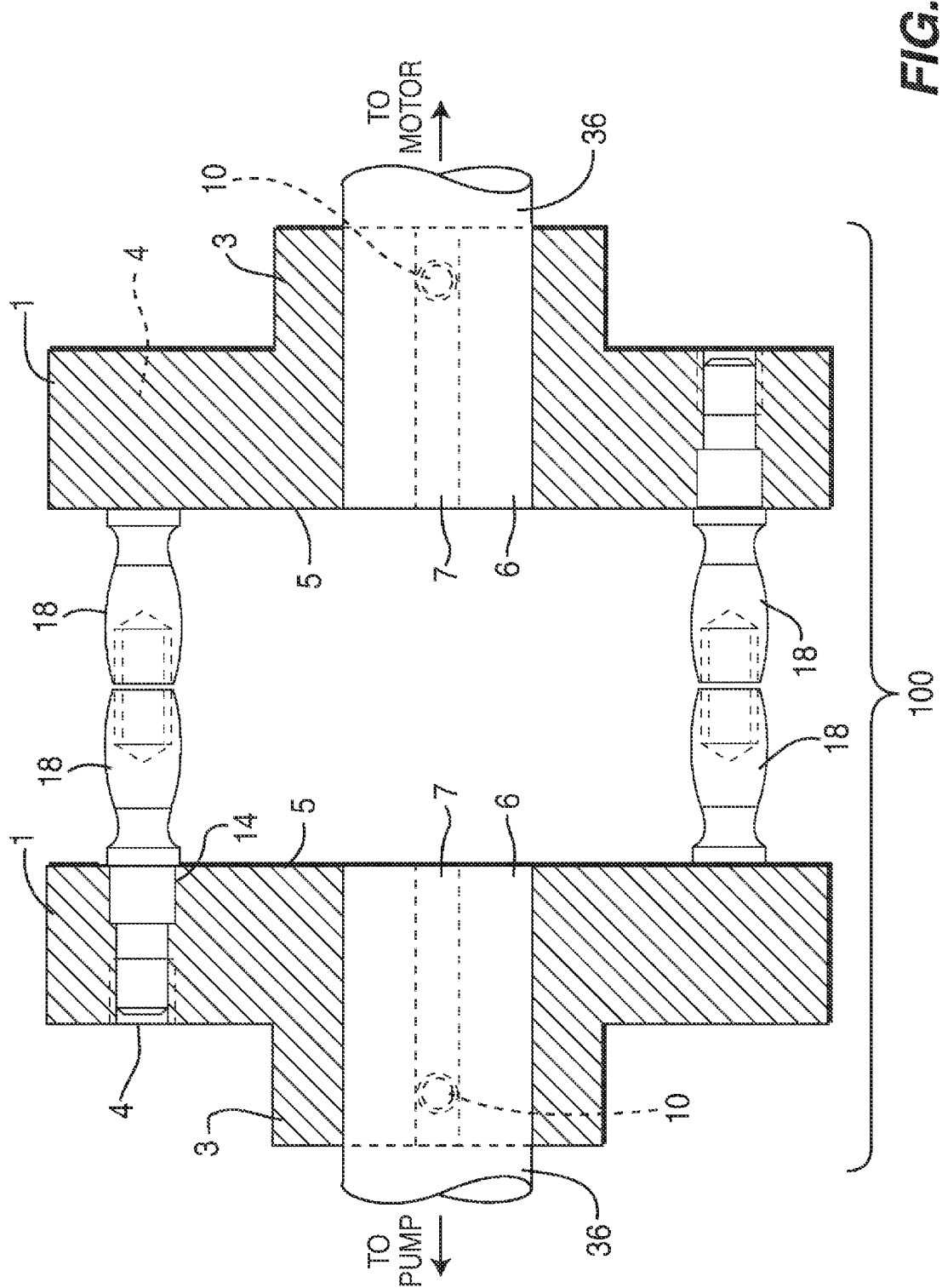
FIG. 1 shows a sectional side-view of a portion of a coupling namely, two facing circular hubs according to the invention.

The invention provides a coupling for attaching a pair of longitudinally aligned, rotatable shafts. Referring to FIG. 1, a coupling portion 100 is shown which has a pair of circular hubs, namely, a first circular hub 1 and a second circular hub 1. Each circular hub 1 has a flat, inwardly positioned front surface 5 and an outer surface 4. Each hub also has a bore 6 through the hub's central axis. The bores extend entirely through the hub 1. Each bore 6 has a means 7, for fixing a circular shaft 36 within each hub bore 6. Each shaft terminates substantially flush with the inner flat surface 5 of each hub. The means 7 may comprise a keyway or the like through each hub for engaging a complementary key on the shaft. Each shaft is fixed within each keyway, for example, by means of a tool such as screw 10. The outer surface 4 of each hub may contain a shaft supporting sleeve 3 which is concentric with bore 6, and which projects out from the outer surface 4 of each hub. In one arrangement, one shaft 36 leads to a motor and one shaft 36 leads to a pump. Each hub 1 may have any convenient number of circular coupling pins 18, preferably from about two to about thirty.

Figure 3:
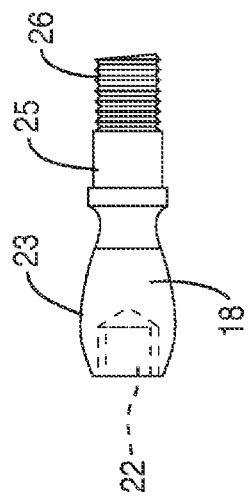
FIG. 3 shows a side-view of a coupling pin of the present invention.
Figure 2:
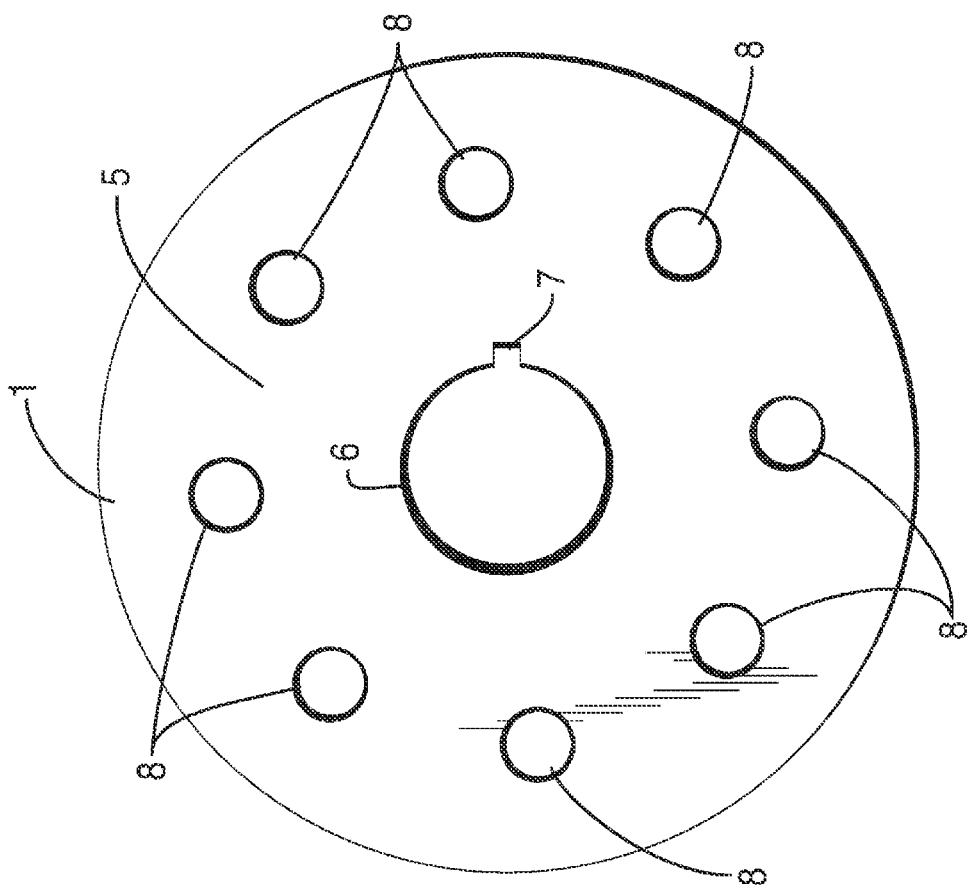
FIG. 2 shows a view of a front surface of a circular hub before pin insertion.

As shown in FIG. 2, each hub 1 has a plurality of circular apertures 8 through the face 5 of hub 1 which are spaced around the bore 6. Although the hub is shown with three apertures, it may contain from about two to about thirty or more circular apertures 8. The apertures are preferably equally spaced around each hub and have centers equidistant from a central axis of the bore 6 as shown. However, there may also be two or more arrays rows of apertures having centers at equal radii per row from the center of the bore. The apertures 8 preferably have inner threads which engage with complementary threads on coupling pins 18. Referring to FIG. 3, the coupling pins 18 may be cylindrical or barrel shaped, and preferably each have a round head 23 and a screw end 25. Each round head 23 has a recessed fitting 22 for engaging an Allen wrench. The screw ends 25 of the pins 18 have outer threads 26 which engage with the inner threads of the apertures 8 in the circular hubs.

It is preferred that each of the front surfaces 5 of the two circular hubs have the same number of pins. The coupling pins 18 on the inner flat front surface 5 of hubs 1 are preferably arranged symmetrically balanced around the central bore 6. As shown in FIG. 1, a shaft 36 is positioned within the bore 6 of each hub 1. As an example, one of the shafts may connect to a motor, such as a 7 h.p. to 1,000 h.p. motor or larger, and the other shaft may connect to a pump, such as a pump in a chemical process or water transmitting facility, or other suitable mechanical device. Several coupling pins 18 extend outwardly from the front surface 5 each circular hub 1.

As seen in FIG. 1, each of the coupling pins 18 the first circular hub 1 is in close juxtaposition with, facing, and longitudinally aligned with a corresponding coupling pin 18 of the second circular hub 1 to define a plurality of mating pairs of coupling pins. FIG. 1, as an example, shows two mating pairs of coupling pins. In order to achieve proper shaft rotation, it is important that the hubs have appropriate clearance from each other. For example, the coupling pins may be spaced from each other within each mating pair of coupling pins by from about 1/32 inch to about 3/32 inch. The circular hubs 1 and the coupling pins 18 may be made of any suitable material, the most preferred being stainless steel. The hubs may have any suitable diameter, for example from about 2 inches or less, to about two feet in diameter or more.

Figure 4:
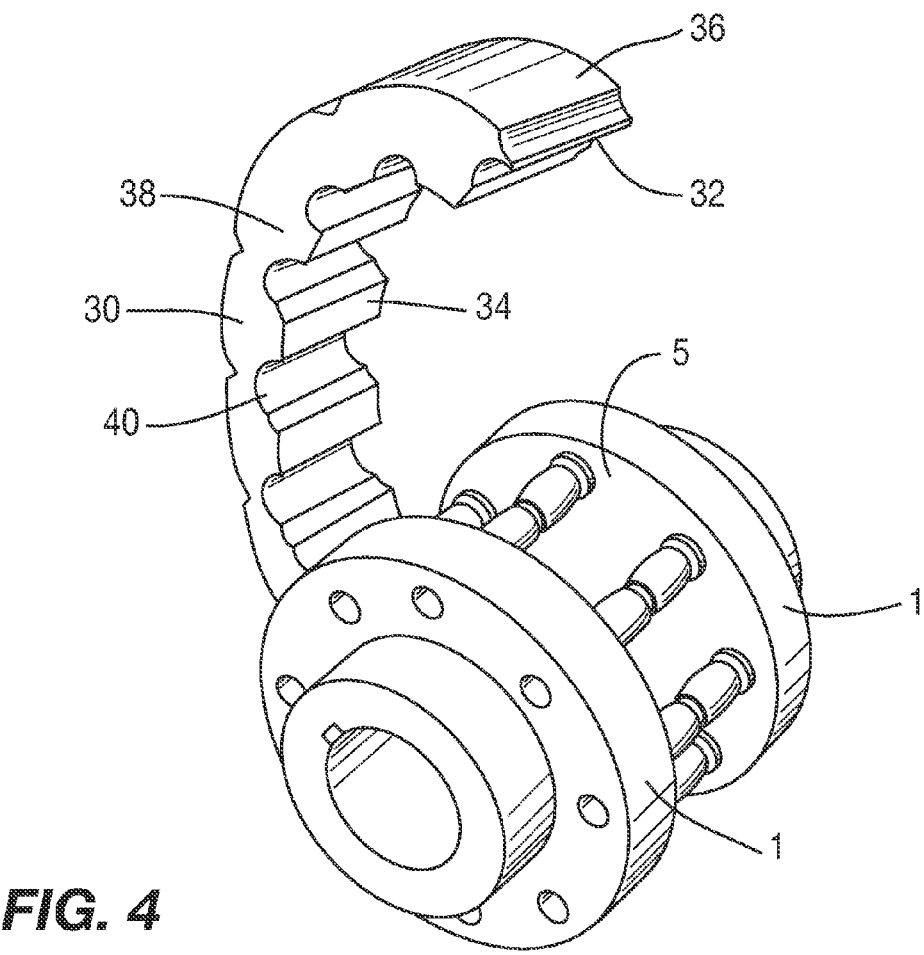
FIG. 4 shows a retainer partially wrapped around mating pins of the circular hubs.
Figure 5:
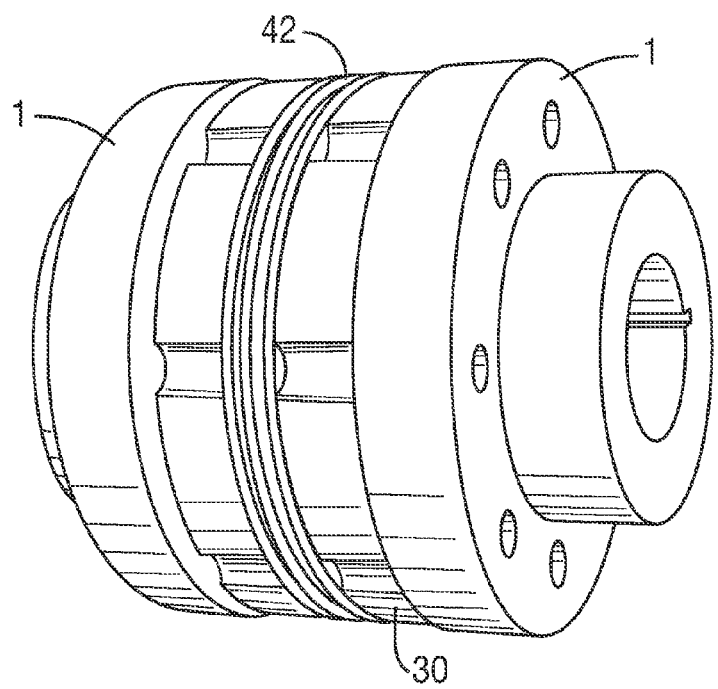
FIG. 5 shows a retainer fully wrapped around mating pins of the circular hubs and further bound by a cincture.

FIG. 4 shows another part of the inventive coupling which is a solid, flexible, substantially annular restraint 30 partially wrapped around the mating pairs of pins 18. The restraint 30 has split ends 32, an inner surface 34, an outer surface 36, and a thickness 38. Several semi-cylindrical concavities 40 are positioned around and through the inner surface 34 of the restraint and extend a part of a thickness 38 toward the outer surface 36 of restraint 30. The restraint 30 is positioned between the front surface 5 of the first circular hub 1 and the front surface 5 of the second circular hub 1 such that the restraint 30 is wrapped around the mating pairs of coupling pins 18 such that the split ends 32 align, and one mating pair of coupling pins 18 is positioned within each of the semi-cylindrical concavities 40. As seen in FIG. 5, when the restraint 30 is fully wrapped around the mating pairs of coupling pins 18, and the split ends 32 align, a cincture 42 is fastened around the outer surface 36 of the restraint 30. The restraint 30 may comprise any suitable material, preferably a polymeric material such as polyurethane. The cincture 42 may comprise any suitable material such as a belt or spring. In the practice of the invention, a shaft 36 is connected to a motor or a pump, or the like. As the shafts rotate, they cause rotation of the coupling of the present invention. During rotation, longitudinal alignment of the shafts 36 may become distorted or misaligned. However, because the retainer 30 is free floating around the mating pairs of coupling pins 18 which are within the semi-cylindrical concavities, the coupling of the invention allows for a great degree of tolerable flexibility between the hubs. If the shafts 36 become misaligned, the retainer 30 then corrects for misalignment.

The retainer 30 and first circular hub 1 and a second circular hub 1 re-align and compensate for distortion between the two shafts. Since the coupling does not transmit any significant radial force to the rotating shafts 36, it will increase the life of the coupling. It is also within the contemplation of the instant invention that a several coupling devices according to the invention may be connected in series.

In a process for using the coupling, a shaft 36 is attached to each circular hub 1 through its bore 6. The a first circular hub 1 and the second circular hub 1 are positioned to be in proximity to each other such that each of the coupling pins 18 of the first circular hub 1 are positioned in close juxtaposition with, facing, and longitudinally aligned with a corresponding coupling pin 18 of the second circular 1 hub to define a plurality of mating pairs of coupling pins. The restraint 30 is wrapped between the front surface 5 of the first circular hub 1 and the front surface 5 of the second circular hub 1 such that the split ends 32 align and one mating pair of coupling pins 18 is positioned within each of the semi-cylindrical concavities 40. Then a cincture 42 is fastened around the outer surface of the restraint 30.

While the invention has been shown and described with reference to a preferred embodiment, it is not to be considered limited thereby, but only construed in accordance with the following claims.

What is claimed is:

1. A coupling for attaching a pair of longitudinally aligned, rotatable shafts comprising:
   a) a first circular hub and a second circular hub, each circular hub having a front surface; each circular hub having a bore through a central axis thereof and a tool for fixing a shaft within each bore; a plurality of removable coupling pins extending outwardly from the front surface of each circular hub; each of the coupling pins of the first circular hub being in close juxtaposition with, facing, and longitudinally aligned with a corresponding coupling pin of the second circular hub to define a plurality of mating pairs of coupling pins;
   b) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; the restraint being positioned between the front surface of the first circular hub and the front surface of the second circular hub such that the restraint is wrapped around the mating pairs of coupling pins such that the split ends align and one mating pair of coupling pins is positioned within each of the semi-cylindrical concavities; and
   c) a cincture fastened around the outer surface of the restraint.

2. The coupling of claim 1 wherein the coupling pins are cylindrical.

3. The coupling of claim 1 wherein the coupling pins are barrel shaped.

4. The coupling of claim 1 wherein the cincture comprises a spring.

5. The coupling of claim 1 wherein the restraint comprises a polymeric material.

6. The coupling of claim 1 wherein the restraint comprises polyurethane.

7. The coupling of claim 1 wherein the tool for fixing a shaft within each bore comprises a keyway through each circular hub, an engaging key on each shaft, and a screw which is turnable into said keyway.

8. The coupling of claim 1 wherein the coupling pins are equally spaced around each circular hub and have centers equidistant from the central axis of the bore.

9. The coupling of claim 1 wherein each circular hub has from about two to about thirty coupling pins.

10. The coupling of claim 1 wherein each coupling pin has a screw end for attaching into the first circular hub or the second circular hub.

11. The coupling of claim 10 wherein each coupling pin has a recessed fitting at an end opposite to the screw end for engaging a wrench.

12. The coupling of claim 1 wherein the first circular hub, the second circular hub and coupling pins comprise stainless steel.

13. The coupling of claim 1 wherein the coupling pins are spaced from each other within each mating pair of coupling pins by from about 1/32 inch to about 3/32 inch.

14. The coupling of claim 1 wherein the restraint is free floating around the mating pairs of coupling pins which are within the semi-cylindrical concavities.

15. An assembly comprising the coupling of claim 1 and a shaft fixed within the bore of each circular hub.

16. The assembly of claim 15 further comprising a motor attached to one of the shafts.

17. The assembly of claim 15 further comprising a motor attached to one of the shafts and a pump attached to the other shaft.

18. A process for attaching a pair of longitudinally aligned, rotatable shafts comprising:
   i) providing a coupling comprising:
      a) a first circular hub and a second circular hub, each circular hub having a front surface; each circular hub having a bore through a central axis thereof and a tool for fixing a shaft within each bore; a plurality of removable coupling pins extending outwardly from the front surface of each circular hub; each of the coupling pins of the first circular hub being positionable in close juxtaposition with, facing, and longitudinally aligned with a corresponding coupling pin of the second circular hub to define a plurality of mating pairs of coupling pins;
      b) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; the restraint being positionable between the front surface of the first circular hub and the front surface of the second circular hub such that the restraint is wrappable around the mating pairs of coupling pins such that the split ends align and one mating pair of coupling pins is positionable within each of the semi-cylindrical concavities; and
      c) a cincture for fastening around the outer surface of the restraint;
   ii) attaching a shaft to each circular hub through its bore;
   iii) positioning the a first circular hub and the second circular hub in proximity to each other such that each of the coupling pins of the first circular hub are positioned in close juxtaposition with, facing, and longitudinally aligned with a corresponding coupling pin of the second circular hub to define a plurality of mating pairs of coupling pins;

iv) wrapping the restraint between the front surface of the first circular hub and the front surface of the second circular hub such that the split ends align and one mating pair of coupling pins is positioned within each of the semi-cylindrical concavities; and v) fastening a cincture around the outer surface of the restraint.

19. A retainer for a shaft coupling having a variable number of removable coupling pins, comprising:

a) a solid, flexible, substantially annular restraint having split ends, an inner surface, an outer surface, and a thickness; a plurality of semi-cylindrical concavities being positioned around and through the inner surface of the restraint and extending a part of a thickness toward the outer surface of the restraint; and b) a cincture for fastening around the outer surface of the restraint.

20. The retainer of claim 19 which comprises polyurethane.

* * * * *